(12) United States Patent
Miki

(10) Patent No.: US 10,847,797 B2
(45) Date of Patent: Nov. 24, 2020

(54) CATHODE ACTIVE MATERIAL AND FLUORIDE ION BATTERY

(71) Applicant: TOYOTA JIDOSHA KABUSHIKI KAISHA, Toyota (JP)

(72) Inventor: Hidenori Miki, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 235 days.

(21) Appl. No.: 15/979,964

(22) Filed: May 15, 2018

(65) Prior Publication Data

US 2018/0351176 A1 Dec. 6, 2018

(30) Foreign Application Priority Data

Jun. 1, 2017 (JP) .................... 2017-109296
Mar. 6, 2018 (JP) .................... 2018-039805

(51) Int. Cl.
- *H01M 4/58* (2010.01)
- *H01M 10/0562* (2010.01)
- *C01G 21/00* (2006.01)
- *H01M 4/38* (2006.01)
- *H01M 10/36* (2010.01)

(Continued)

(52) U.S. Cl.
CPC .......... *H01M 4/582* (2013.01); *C01G 21/006* (2013.01); *H01M 4/136* (2013.01); *H01M 4/388* (2013.01); *H01M 10/0562* (2013.01); *H01M 10/36* (2013.01); *C01P 2002/50* (2013.01); *C01P 2002/72* (2013.01); *C01P 2002/77* (2013.01); *C01P 2004/62* (2013.01); *C01P 2006/40* (2013.01); *H01M 2004/028* (2013.01);

(Continued)

(58) Field of Classification Search
CPC .............. C01G 21/006; C01P 2002/50; C01P 2002/72; C01P 2002/77; C01P 2004/62; C01P 2006/40; H01M 10/0562; H01M 10/36; H01M 2004/028; H01M 2300/0068; H01M 2300/008; H01M 4/136; H01M 4/388; H01M 4/582
See application file for complete search history.

(56) References Cited

U.S. PATENT DOCUMENTS

| | | | |
|---|---|---|---|
| 4,399,204 A * | 8/1983 | Clark | H01M 4/582 429/225 |
| 5,320,917 A | 6/1994 | Takada et al. | |

(Continued)

FOREIGN PATENT DOCUMENTS

| | | |
|---|---|---|
| JP | H04-238815 A | 8/1992 |
| JP | 2008-537312 A | 9/2008 |

OTHER PUBLICATIONS

Kennedy et al. "Thin-Film Galvanic Cell Pb/PbF2/PbF2,CuF2/Cu." Journal of the Electrochemical Society, Jan. 1, 1976, vol. 123, No. 1, pp. 10-14.

(Continued)

*Primary Examiner* — Adam A Arciero
(74) *Attorney, Agent, or Firm* — Oliff PLC

(57) ABSTRACT

A main object of the present disclosure is to provide a novel cathode active material that may be used for a fluoride ion battery. The present disclosure achieves the object by providing a cathode active material used for a fluoride ion battery, comprising a composition represented by $Pb_{2-x}Cu_{1+x}F_6$, wherein $0 \leq x < 2$.

13 Claims, 6 Drawing Sheets

(51) Int. Cl.
*H01M 4/136* (2010.01)
*H01M 4/02* (2006.01)

(52) U.S. Cl.
CPC .............. *H01M 2300/008* (2013.01); *H01M 2300/0068* (2013.01)

(56) References Cited

U.S. PATENT DOCUMENTS

2008/0102373 A1* 5/2008 Potanin ............... H01M 4/0492
429/309
2016/0043439 A1* 2/2016 Nakamoto ........ H01M 10/0569
429/340

OTHER PUBLICATIONS

Kennedy et al. "Thin-Film Galvanic Cell Pb/PbF2/PbF2,CuF2/Cu." Journal of the Electrochemical Society, Jan. 1, 1976, vol. 113, No. 1, pp. 10-14.
Samouel et al. "Powder diffraction data for copper hexaflorides:Ba2CuF6 and Pb2CuF6." Sep. 1995, vol. 10, No. 3, pp. 221-222.
Jean-Michel Dance, "The Ferromagnetic Fluoride, Pb2CuF6," Mat. Res. Bull., 1985, vol. 20, pp. 431-435.
I I Bushinskaya et al., "Lead difluoride and related systems," Russian Chemical Reviews, 2004, vol. 73 (4), pp. 371-400.
Reddy et al., "Batteries based on fluoride shuttle," Journal of Materials Chemistry, 2011, vol. 21, pp. 17059-17062.

* cited by examiner

… (1) …

CATHODE ACTIVE MATERIAL AND FLUORIDE ION BATTERY

TECHNICAL FIELD

The present disclosure relates to a novel cathode active material that may be used for a fluoride ion battery.

BACKGROUND ART

As high-voltage and high-energy density batteries, for example, Li ion batteries are known. The Li ion battery is a cation-based battery utilizing a Li ion as a carrier. Meanwhile, as anion-based batteries, fluoride ion batteries utilizing a fluoride ion as a carrier are known.

For example, Non-Patent Literature 1 exemplifies $CuF_2$, $BiF_3$, $SnF_2$, and $KBiF_4$ as a cathode active material of a fluoride ion battery. Also, Patent Literature 1 exemplifies a number of fluoride salts (such as CuF, $CuF_2$, $PbF_2$, and $PbF_4$) as a cathode of a fluoride ion battery in a charged state. Incidentally, Non-Patent Literature 2 discloses $Pb_2CuF_6$ as a ferromagnetic fluoride salt. Also, Non-Patent Literature 3 describes a phase diagram of $PbF_2$—$CuF_2$ system.

CITATION LIST

Patent Literature

Patent Literature 1: Japanese Patent Application Laid-Open (JP-A) No. 2008-537312

Non-Patent Literatures

Non-Patent Literature 1: M. Anji Reddy et al., "Batteries based on fluoride shuttle", J. Mater. Chem., 2011, 21. 17059-17062
Non-Patent Literature 2: Jean-Michel Dance, "The Ferromagnetic Fluoride, $Pb_2CuF_6$", Mat. Res. Bull., Vol. 20, pp. 431-435 1985
Non-Patent Literature 3: I I Buchinskaya et al., "Lead difluoride and related systems", Russian Chemical Reviews, 73 (4) 371-400 (2004)

SUMMARY OF DISCLOSURE

Technical Problem

In order to improve the performance of a fluoride ion battery, a novel cathode active material is demanded. The present disclosure has been made in view of the above circumstances, and a main object thereof is to provide a novel cathode active material that may be used for a fluoride ion battery.

Solution to Problem

In order to achieve the object, the present disclosure provides a cathode active material used for a fluoride ion battery, comprising a composition represented by $Pb_{2-x}Cu_{1+x}F_6$, wherein $0 \le x < 2$.

According to the present disclosure, it was found out that a compound having a predetermined composition may be used as a cathode active material of a fluoride ion battery.

In the disclosure, the x preferably satisfies $x \le 1.75$.
In the disclosure, the x preferably satisfies $0.5 \le x \le 1.5$.

Also, the present disclosure provides a cathode active material used for a fluoride ion battery, comprising a Pb element, a Cu element, and a F element, and the cathode active material has a peak at a position of $2\theta=22.6°\pm0.5°$, $27.8°\pm0.5°$, $38.5°\pm0.5°$, and $44.8°\pm0.5°$ in X-ray diffraction measurement using a CuKα ray.

According to the present disclosure, it was found out that a compound having a predetermined crystal structure may be used as a cathode active material of a fluoride ion battery.

Also the present disclosure provides a fluoride ion battery comprising a cathode active material layer, an anode active material layer, and an electrolyte layer formed between the cathode active material layer and the anode active material layer, and the cathode active material layer includes the above described cathode active material.

According to the present disclosure, a fluoride ion battery having excellent charge-discharge property may be obtained by using the above described cathode active material.

In the disclosure, the electrolyte layer is preferably a solid electrolyte layer.

In the disclosure, the cathode active material layer preferably does not include a solid electrolyte.

In the disclosure, the cathode active material layer preferably includes only $PbF_2$ as a solid electrolyte.

Advantageous Effects of Disclosure

The present disclosure exhibits effects such that a novel cathode active material that may be used for a fluoride ion battery may be provided.

DESCRIPTION OF EMBODIMENTS

The cathode active material and the fluoride ion battery in the present disclosure will be hereinafter described in detail.

A. Cathode Active Material

The cathode active material of the present disclosure is a cathode active material used for a fluoride ion battery. Usually, the cathode active material includes at least a Pb element, a Cu element, and a F element. Also, the cathode active material preferably comprises a composition represented by $Pb_{2-x}Cu_{1+x}F_6$, wherein $0 \leq x < 2$. Also, the cathode active material preferably has a peak at a predetermined position in X-ray diffraction measurement.

According to the present disclosure, it was found out that a predetermined compound may be used as a cathode active material of a fluoride ion battery. As a cathode active material for a fluoride ion battery, Cu is conventionally known, and Cu is a useful material because of theoretical capacity and potential thereof. Meanwhile, since the fluoride ion diffusion coefficient of Cu is low, it is difficult to make Cu function as an active material unless a fine particle is used. Specifically, the fluoride ion needs to be diffused among Cu upon charge; however, since diffusion coefficient thereof is low, the reaction does not proceed into the inside of Cu if a particle having large particle size is used, and the charging stops by the fluorination reaction of only Cu surface so that the theoretical capacity cannot be obtained.

In contrast, the cathode active material of the present disclosure is phase split upon discharge into $PbF_2$ that functions as a solid electrolyte (ion conductor) and Cu that functions as an active material. Since $PbF_2$ is present within the active material, the fluoride ion diffusion coefficient is high; as the result, there is an advantage that it may function as the active material, even if it is not in a form of a fine particle. The cathode active material of the present disclosure also has an advantage that it may be charged and discharged at a potential same level as Cu.

Figure 1:
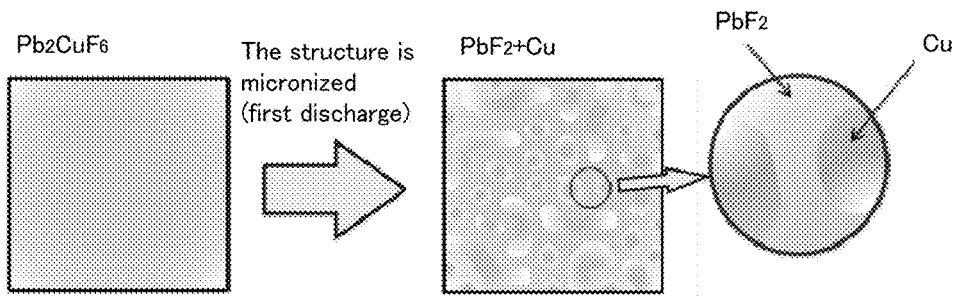
FIG. 1 is a schematic diagram explaining the phase splitting of $Pb_2CuF_6$.

FIG. 1 is a schematic diagram explaining the phase splitting of $Pb_2CuF_6$. As shown in FIG. 1, the crystal structure of $Pb_2CuF_6$ is even. After that, $Pb_2CuF_6$ is phase split into $PbF_2$ and Cu by discharging so that the structure is micronized. This phenomenon is presumed to correspond to a spinodal decomposition (a phase separation corresponding to a state change from an unstable state to an equilibrium state). The phase split $PbF_2$ and Cu are dispersed at an atomic level, and an excellent interface is formed between $PbF_2$ and Cu. Since $PbF_2$ is present within the active material, the fluoride ion diffusion coefficient is high; as the result, it may function as the active material, even if it is not in a form of a fine particle.

The cathode active material of the present disclosure preferably has a composition represented by $Pb_{2-x}Cu_{1+x}F_6$, wherein $0 \leq x < 2$. Incidentally, the cathode active material of the present disclosure may include a tiny amount of other element to such an extent that a desired effect may be obtained. The x may be 0, and may be more than 0. In the latter case, the x may satisfy $0.1 \leq x$, may satisfy $0.2 \leq x$, and may satisfy $0.5 \leq x$. Meanwhile, the x is usually less than 2, the x may satisfy $x \leq 1.75$, and may satisfy $x \leq 1.5$.

The cathode active material of the present disclosure preferably has a peak at a position of at least one of $2\theta = 22.6° \pm 0.5°$, $27.8° \pm 0.5°$, $30.80 \pm 0.5°$, $31.6° \pm 0.50$, $38.50 \pm 0.50$, $39.10 \pm 0.5°$, and $44.80° 0.5°$ in X-ray diffraction measurement using a CuKα ray. Incidentally, the width of these peak positions may be $\pm 0.3°$, and may be $\pm 0.1°$. Incidentally, the crystal phase (crystal structure) having the above described peak may be referred to as $Pb_2CuF_6$ structure.

Also, when a diffraction intensity of a peak at $2\theta = 22.6° \pm 0.5°$ is regarded as $I_1$, and a diffraction intensity of a peak at $2\theta = 27.8° \pm 0.5°$ is regarded as $I_2$, the proportion of $I_1$ to $I_2$ ($I_1/I_2$) is, for example, 0.1 or more, and may be 0.2 or more. Meanwhile, $I_1/I_2$ is, for example, 0.5 or less.

The cathode active material of the present disclosure preferably includes the crystal phase having the above described peak as the main phase. The proportion of the crystal phase to all the crystal phases included in the cathode active material is, for example, 50% by weight or more, may be 70% by weight or more, and may be 90% by weight or more.

The shape of the cathode active material of the present disclosure is not particularly limited, and examples thereof may include a granular shape. The average particle size ($D_{50}$) of the cathode active material is, for example, in a range of 0.1 μm to 50 μm, and preferably in a range of 1 μm to 20 μm. The average particle size ($D_{50}$) of the cathode active material may be obtained from, for example, the result of a particle size distribution measurement by laser diffraction scattering method.

A method for producing the cathode active material of the present disclosure is not particularly limited as long as an intended cathode active material may be obtained by the method. Examples of the method may include a mechanical milling.

B. Fluoride Ion Battery

Figure 2:
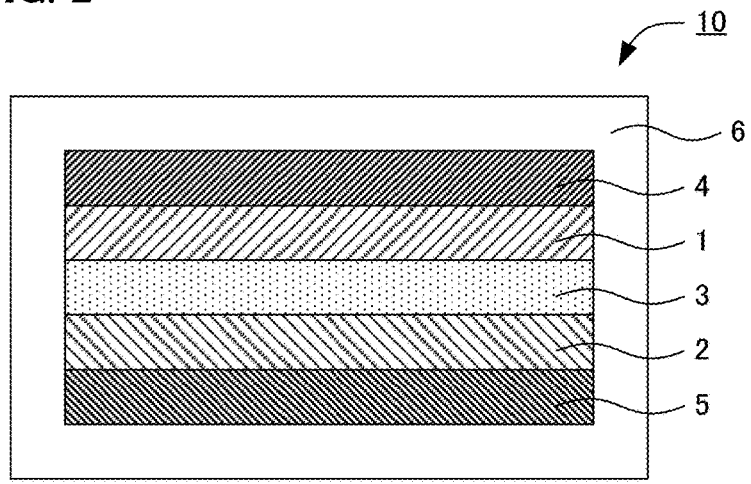
FIG. 2 is a schematic cross-sectional view showing an example of the fluoride ion battery of the present disclosure.

FIG. 2 is a schematic cross-sectional view showing an example of the fluoride ion battery of the present disclosure. Fluoride ion battery 10 shown in FIG. 2 comprises cathode active material layer 1 including a cathode active material, anode active material layer 2 including an anode active material, electrolyte layer 3 formed between cathode active material layer 1 and anode active material layer 2, cathode current collector 4 that collects current of cathode active material layer 1, anode current collector 5 that collects current of anode active material layer 2, and battery case 6 that houses these members. The major feature in the present disclosure is that cathode active material layer 1 includes the cathode active material described in "A. Cathode active material" above.

According to the present disclosure, a fluoride ion battery having excellent charge-discharge property may be obtained by using the above described cathode active material.

The fluoride ion battery of the present disclosure will be hereinafter described with respect to each constitution.

1. Cathode Active Material Layer

The cathode active material layer in the present disclosure is a layer including at least a cathode active material. The cathode active material is similar to that described in "A. Cathode active material" above. The content of the cathode active material in the cathode active material layer is 25% by weight or more, for example, preferably 50% by weight or more, and more preferably 75% by weight or more.

The cathode active material layer may further include at least one of a conductive material and a binder besides the cathode active material. The conductive material is not particularly limited as long as the conductive material has desired electron conductivity. Examples of the conductive material may include carbon materials. Examples of the carbon material may include carbon blacks such as acetylene black, Ketjen black, furnace black, and thermal black; graphene; fullerene; and carbon nanotube. The content of the conductive material in the cathode active material layer is, for example, 10% by weight or less, and may be 5% by weight or less.

The binder is not particularly limited if it is chemically and electronically stable, and examples thereof may include fluorine based binders such as polyvinylidene fluoride (PVDF) and polytetrafluoroethylene (PTFE). The content of the binder in the cathode active material layer is, for example, 10% by weight or less, and may be 5% by weight or less.

The cathode active material layer may not include a solid electrolyte. In this case, the cathode active material layer preferably includes the cathode active material and the conductive material. A fluoride ion battery comprising a cathode active material layer including no solid electrolyte is, for example, a fluoride ion battery before the first discharge. In this case, the cathode active material layer preferably does not have the peak of $PbF_2$ that is the solid electrolyte, when XRD measurement thereof is carried out. Incidentally, the stipulation that "does not include a solid electrolyte" includes, for example, a case in which a tiny amount of a solid electrolyte is added intending to avoid a patent infringement. For example, when the proportion of the solid electrolyte in the cathode active material layer is 5% by weight or less, the case satisfies the stipulation "does not include a solid electrolyte".

Meanwhile, the cathode active material layer may contain only $PbF_2$ as a solid electrolyte. In this case, the cathode active material layer preferably contains the cathode active material, $PbF_2$, and the conductive material. An example of the fluoride ion battery comprising the cathode active material layer including only $PbF_2$ as the solid electrolyte is a fluoride ion battery after the first discharge. In this case, the cathode active material layer after a charge preferably has the peak of the cathode active material and the peak of $PbF_2$ that is the solid electrolyte, when XRD measurement thereof is carried out. Examples of the distinguishing peak of $PbF_2$ may include $2\theta=26.0°\pm0.5°$, $30.0°\pm0.5°$, $43.0°\pm0.5°$, and $50.9°\pm0.5°$. Incidentally, the width of these peak positions may be $\pm0.3°$, and may be $\pm0.1°$. Incidentally, the stipulation that "includes only $PbF_2$ as a solid electrolyte" includes, for example, a case in which a tiny amount of a solid electrolyte other than $PbF_2$ is added intending to avoid a patent infringement. For example, when the proportion of the solid electrolyte other than $PbF_2$ in the cathode active material layer is 5% by weight or less, the case satisfies the stipulation "includes only $PbF_2$ as a solid electrolyte".

Also, $PbF_2$ included in the cathode active material layer is typically a solid electrolyte deriving from the cathode active material. Whether $PbF_2$ is the solid electrolyte deriving from the cathode active material or not may be identified by, for example, observation with a transmission electron microscope (TEM). For example, if the active material (Cu) and the solid electrolyte ($PbF_2$) are dispersed at an atomic level when the TEM measurement of the cathode active material layer after discharge is carried out, it may be said that $PbF_2$ derives from the cathode active material (such as $Pb_2CuF_6$). Incidentally, the cathode active material includes Cu deriving from the cathode active material (such as $Pb_2CuF_6$) before the first discharge. According to the degree of the discharge, the cathode active material layer may include only Cu as the cathode active material, and may include the cathode active material (such as $Pb_2CuF_6$) before the first discharge, besides Cu.

The cathode active material layer may or may not include a solid electrolyte other than $PbF_2$; however, the latter is preferable. This is because, when the ion conductive path is too much, the electron conductive path runs short so that the rate property is difficult to be improved. Also, the thickness of the cathode active material layer varies greatly with the constitution of a battery and thus is not particularly limited.

2. Anode Active Material Layer

The anode active material layer in the present disclosure is a layer including at least an anode active material. Also, the anode active material layer may further include at least one of a conductive material, a solid electrolyte, and a binder besides the anode active material.

Any active material having lower potential than the cathode active material may be selected as the anode active material. Examples of the anode active material may include a simple substance of a metal, a metal alloy, a metal oxide, and a fluoride thereof. Examples of the metal element included in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among the above, the anode active material is preferably Mg, $MgF_x$, Al, $AlF_x$, Ce, $CeF_x$, Ca, $CaF_x$, Pb, and $PbF_x$. Incidentally, the above described x is a real number more than 0.

In relation to the conductive material and the binder, the materials similar to those described in "1. Cathode active material layer" above may be used. The solid electrolyte may be similar to the content that will be described in "3. Electrolyte layer" later; thus, the descriptions herein are omitted.

The content of the anode active material in the anode active material layer is preferably large in terms of the capacity, and is, for example, 30% by weight or more, preferably 50% by weight or more, and more preferably 70% by weight or more. Also, the thickness of the anode active material layer varies greatly with the constitution of a battery and thus is not particularly limited.

3. Electrolyte Layer

The electrolyte layer in the present disclosure is a layer formed between the cathode active material layer and the anode active material layer. The electrolyte included in the electrolyte layer may be a liquid electrolyte (electrolyte solution), and may be a solid electrolyte. That is, the electrolyte layer may be a liquid electrolyte layer, may be a solid electrolyte layer, and the latter is preferable.

The electrolyte solution in the present disclosure contains, for example, a fluoride salt and an organic solvent. Examples of the fluoride salt may include an inorganic fluoride salt, an organic fluoride salt, and an ionic liquid. An example of the inorganic fluoride salt may be XF (X is Li, Na, K, Rb or Cs). An example of the cation of the organic fluoride salt may be an alkyl ammonium cation such as a tetramethyl ammonium cation. The concentration of the fluoride salt in the electrolyte solution is, for example, in a range of 0.1 mol % to 40 mol %, and preferably in a range of 1 mol % to 10 mol %.

The organic solvent for the electrolyte solution is usually a solvent that dissolves the fluoride salt. Examples of the organic solvent may include glyme such as triethylene glycol dimethyl ether (G3) and tetraethylene glycol dimethyl ether (G4); cyclic carbonates such as ethylene carbonate (EC), fluoro ethylene carbonate (FEC), difluoro ethylene carbonate (DFEC), propylene carbonate (PC), and butylene carbonate (BC); and chain carbonates such as dimethyl carbonate (DMC), diethyl carbonate (DEC), and ethyl methyl carbonate (EMC). Also, an ionic liquid may be used as the organic solvent.

On the other hand, examples of the solid electrolyte may include an inorganic solid electrolyte. Examples of the inorganic solid electrolyte may include a fluoride including a lanthanoid element such as La and Ce; a fluoride including an alkaline element such as Li, Na, K, Rb, and Cs; and a fluoride including an alkaline earth element such as Ca, Sr, and Ba. Specific examples of the inorganic solid electrolyte may include a fluoride including La and Ba; a fluoride including Pb and Sn; and a fluoride including Bi and Sn.

Also, the thickness of the electrolyte layer in the present disclosure varies greatly with the constitution of a battery and thus is not particularly limited.

4. Other Constitutions

The fluoride ion battery of the present disclosure comprises at least the above described anode active material layer, cathode active material layer, and electrolyte layer. Further, the fluoride ion battery usually comprises a cathode current collector for collecting currents of the cathode active material layer, and an anode current collector for collecting currents of the anode active material layer. Examples of the shape of the current collector may include a foil shape, a mesh shape, and a porous shape. Also, the fluoride ion battery of the present disclosure may include a separator between the cathode active material layer and the anode active material layer. The reason therefor is to obtain a safer battery.

5. Fluoride Ion Battery

The fluoride ion battery of the present disclosure may be a primary battery or may be a secondary battery. Among the above, the secondary battery is preferable, so as to be repeatedly charged and discharged, and is useful as, for example, a car-mounted battery. Incidentally, the secondary battery includes a usage of a secondary battery as a primary battery (the use for the purpose of just one time discharge after charge). Also, examples of the shape of the fluoride ion battery of the present disclosure may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure will be described in more details.

Example 1

<Synthesis of Cathode Active Material>

A cathode active material ($Pb_2CuF_6$) was obtained by weighing $PbF_2$ and $CuF_2$ so as to be $PbF_2:CuF_2=2:1$ in the molar ratio, and carrying out a mechanical milling, using a ball mill, under the conditions of 600 rpm for 3 hours. The average particle size ($D_{50}$) of the obtained cathode active material was 1 μm.

<Production of Evaluation Battery>

A cathode mixture was obtained by mixing the obtained cathode active material ($Pb_2CuF_6$), $Pb_{0.6}Sn_{0.4}F_2$ that is a solid electrolyte (ion conductor), and an acetylene black (AB) that is a conductive material (electron conductor) in the weight ratio of $Pb_2CuF_6:Pb_{0.6}Sn_{0.4}F_2:AB=25:70:5$. An evaluation battery was obtained by pressure powder molding the obtained cathode mixture (working electrode), the solid electrolyte ($Pb_{0.6}Sn_{0.4}F_2$) forming a solid electrolyte layer, and a Pb foil (counter electrode).

Comparative Example 1

An evaluation battery was obtained in the same manner as in Example 1 except that a Cu nanoparticle (average primary particle size of 20 nm) was used as the cathode active material.

<XRD Measurement>

Figure 3:
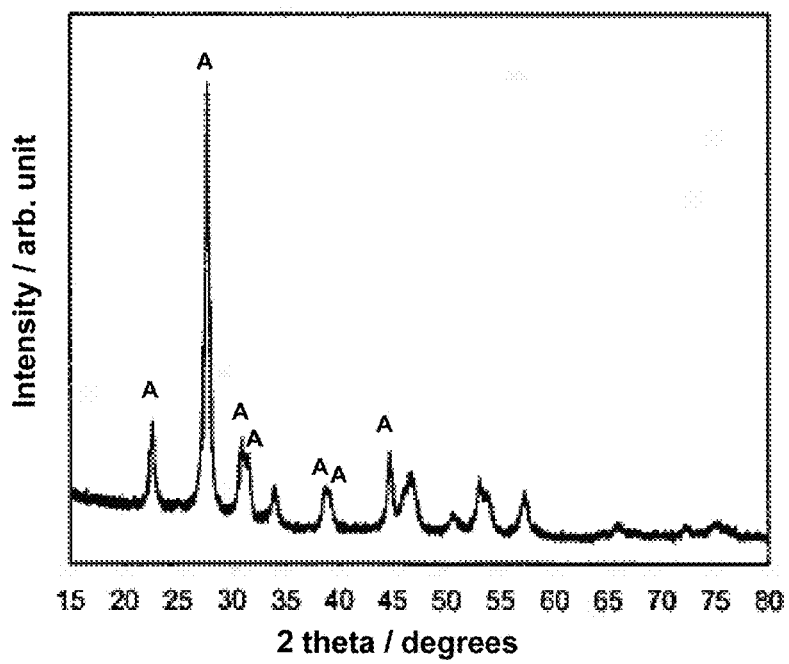
FIG. 3 is a diagram showing the result of XRD measurement to a cathode active material ($Pb_2CuF_6$) produced in Example 1.
Figure 4:
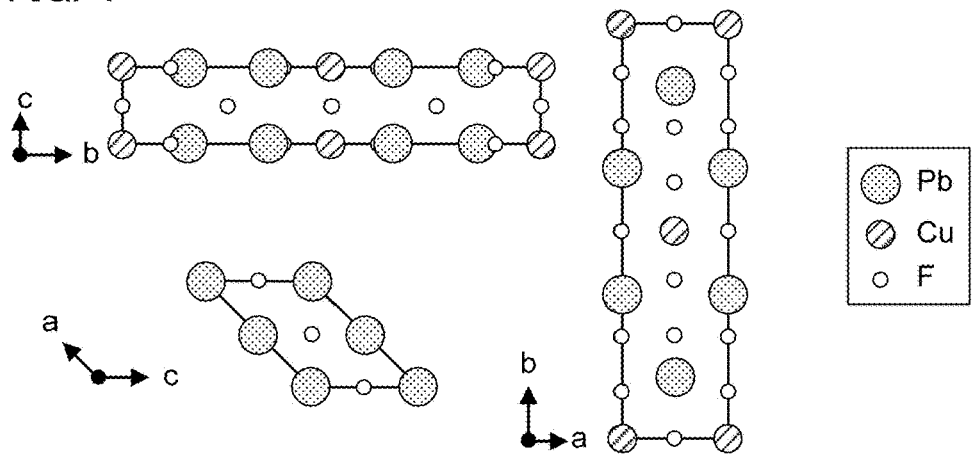
FIG. 4 is a schematic diagram showing the crystal structure of $Pb_2CuF_6$.

An X-ray diffraction measurement (XRD measurement) was carried out to the cathode active material ($Pb_2CuF_6$) produced in Example 1. Incidentally, a CuKα ray was used as a radiation source. The result is shown in FIG. 3. As shown in FIG. 3, it was confirmed that the cathode active material ($Pb_2CuF_6$) produced in Example 1 was a single phase material. The distinguishing peak of $Pb_2CuF_6$ may include peaks at 2θ=22.6°, 27.8°, 30.8°, 31.6°, 38.5°, 39.1° and 44.8°. Also, the crystal structure of $Pb_2CuF_6$ is shown in FIG. 4. The crystal structure of $Pb_2CuF_6$ is classified as the space group of C2/m. Incidentally, the notation of the space group may be slightly varied if the element position is shifted a little.

<CV Measurement and Charge and Discharge Test>

A charge and discharge test of the evaluation battery obtained in each of Example 1 and Comparative Example 1 was carried out in a cell heated to 140° C. The current conditions were: 20 μA/cm$^2$ (discharge) and 40 μA/cm$^2$ (charge). The results are shown in FIGS. 5 and 6.

Figure 5:
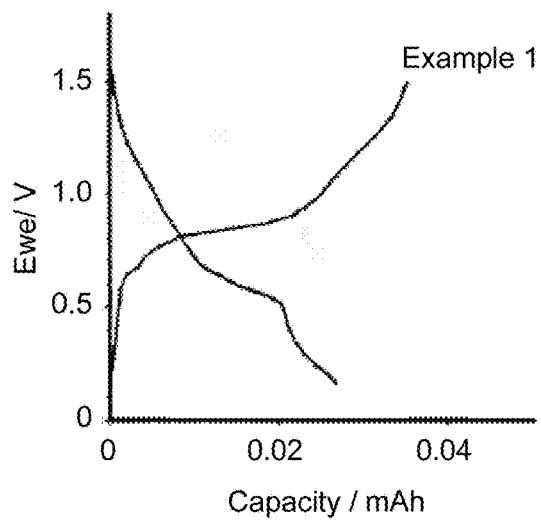
FIG. 5 is a diagram showing the result of a charge and discharge test to an evaluation battery obtained in Example 1.
Figure 6:
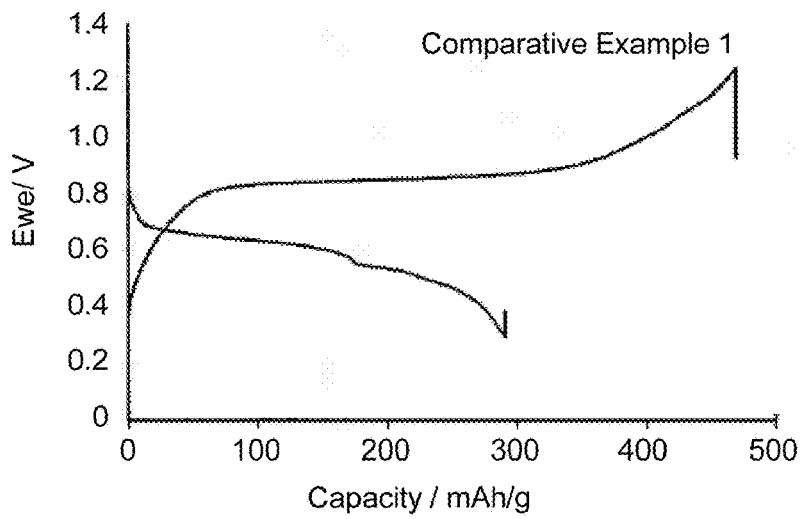
FIG. 6 is a diagram showing the result of a charge and discharge test to an evaluation battery obtained in Comparative Example 1.

As shown in FIGS. 5 and 6, it was confirmed that $Pb_2CuF_6$ used in Example 1 was an active material capable of being charged and discharged at the potential similar to that of Cu used in Comparative Example 1. Also, as described above, in order to make Cu function as an active material, a fine particle must be used; however, it was confirmed that $Pb_2CuF_6$ functioned as an active material even if the particle size is larger than Cu. This result is an excellent effect due to a peculiar charge-discharge mechanism that the cathode active material of the present disclosure is phase split upon the first discharge into the solid electrolyte ($PbF_2$) and the active material (Cu).

Reference Example

Figure 7:
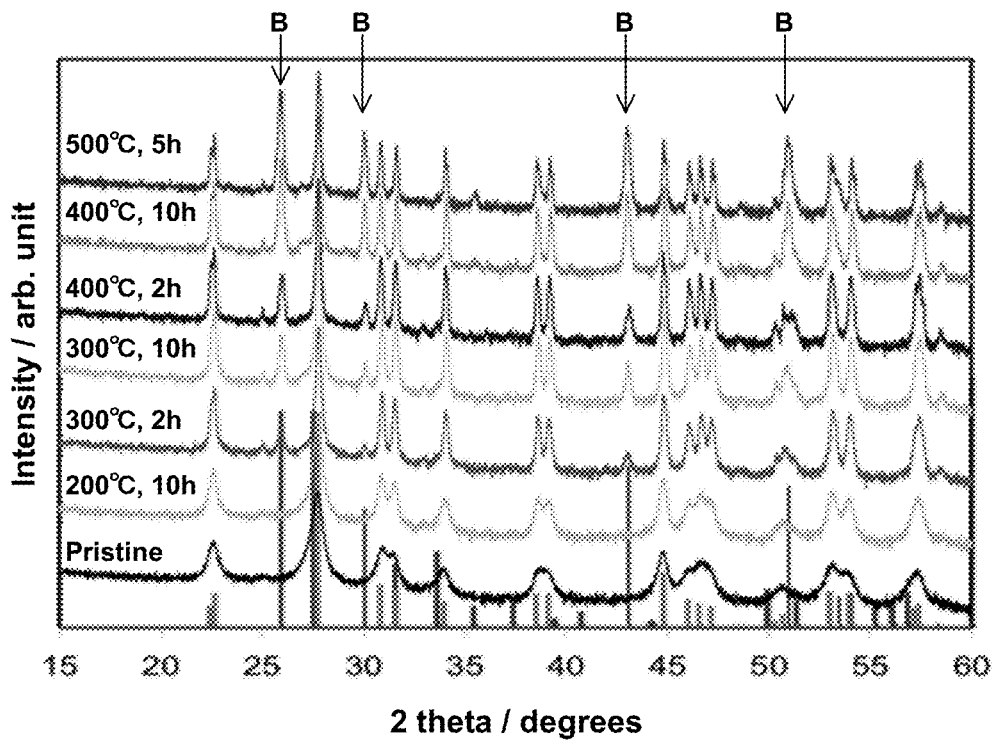
FIG. 7 is a diagram showing the result of XRD measurement to a sample wherein the cathode active material ($Pb_2CuF_6$) produced in Example 1 was heat treated.

When the crystallinity of a cathode active material is improved, the property of the cathode active material is improved in some cases. Therefore, a heat treatment was carried out to the cathode active material ($Pb_2CuF_6$) produced in Example 1, intending to improve the crystallinity. Specifically, heat treatments were carried out under Ar atmosphere, under the following conditions: 200° C. for 10 hours, 300° C. for 2 hours, 300° C. for 10 hours, 400° C. for 2 hours, 400° C. for 10 hours, and 400° C. for 5 hours. The results are shown in FIG. 7.

As shown in GIF. 7, it was surprisingly confirmed that the phase split of $Pb_2CuF_6$ occurred dominantly than the improvement of the crystallinity of $Pb_2CuF_6$. Specifically, the peak of $PbF_2$ (the peak shown with B in FIG. 7) was larger as the strength of the heat treatment was higher. Also, since $PbF_2$ was generated, $CuF_2$ should also be generated stoichiometrically ($Pb_2CuF_6 \rightarrow 2PbF_2+CuF_2$). That is, it was confirmed that a part of $Pb_2CuF_6$ was phase split into $PbF_2$ and $CuF_2$. From this, it is presumed that $Pb_2CuF_6$ is a metastable material. This presumption is also supported by Pb (metal) and Cu (metal) being not solid-dissolved at all in the phase diagram. It is presumed that the metastable state of Pb and Cu, that are not easily solid-dissolved to each other, is maintained in $Pb_2CuF_6$ by the function of high nucleophilicity $F^-$.

Here, when focusing to the phase split of $Pb_2CuF_6$, new manners of utilization of $Pb_2CuF_6$ are evoked. That is, if the phase split of part or all of $Pb_2CuF_6$ into $PbF_2$ and Cu upon discharge (when F is drawn out from $Pb_2CuF_6$) is possible, a functional separation wherein $PbF_2$ is used as a solid electrolyte (ion conductor) and Cu is used as a cathode active material, will be possible. Further, the phase split $PbF_2$ and Cu are dispersed at an atomic level, and an excellent interface is formed between $PbF_2$ and Cu.

Meanwhile, since $PbF_2$ that functions as a solid electrolyte (ion conductor) is generated by the phase split of $Pb_2CuF_6$, if a cathode active material layer preliminarily includes a solid electrolyte, the solid electrolyte will be too much. As the result, the electron conductive path runs short, and the discharging stops halfway. Thus, as the cathode active material layer of a fluoride ion battery (particularly, all solid state fluoride ion battery), an attempt was made to produce a battery using a conventionally not expected cathode active material layer that does not preliminarily include a solid electrolyte.

Example 2

A cathode active material ($Pb_2CuF_6$) was obtained in the same manner as in Example 1. A cathode mixture was obtained by mixing the obtained cathode active material ($Pb_2CuF_6$) and an acetylene black (AB) that is a conductive material (electron conductor) in the weight ratio of $Pb_2CuF_6$:AB=95:5. An evaluation battery was obtained in the same manner as in Example 1 except that the obtained cathode mixture was used.

<Charge and Discharge Test>

Figure 8:
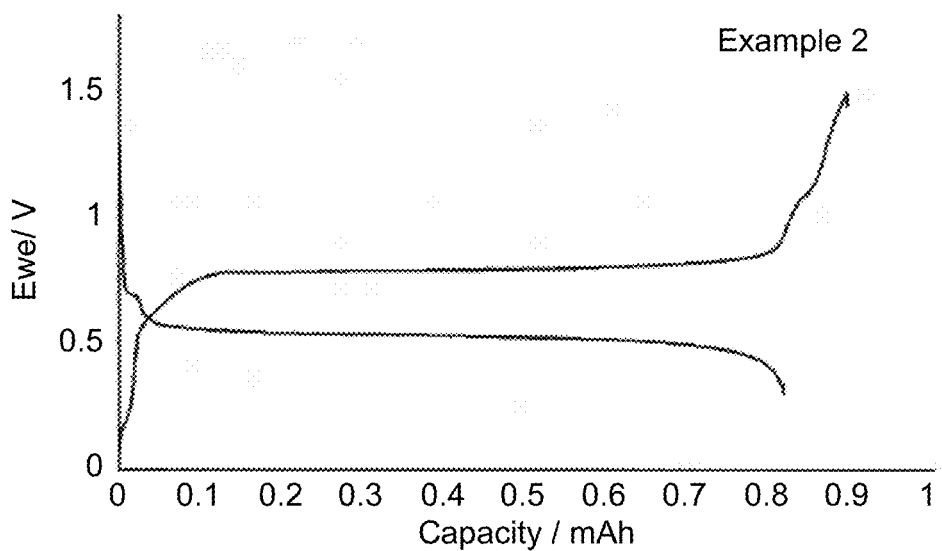
FIG. 8 is a diagram showing the result of a charge and discharge test to an evaluation battery obtained in Example 2.

A charge and discharge test of the evaluation battery obtained in Example 2 was carried out in a cell heated to 140° C. The current conditions were similar to that in Example 1. The result is shown in FIG. 8. As shown in FIG. 8, the evaluation battery obtained in Example 2 exhibited an excellent charge-discharge capacity. Also, the charge-discharge capacity in Example 2 was more than an order of magnitude higher compared to the charge-discharge capacity in Example 1.

<Rate Property Evaluation>

Figure 9:
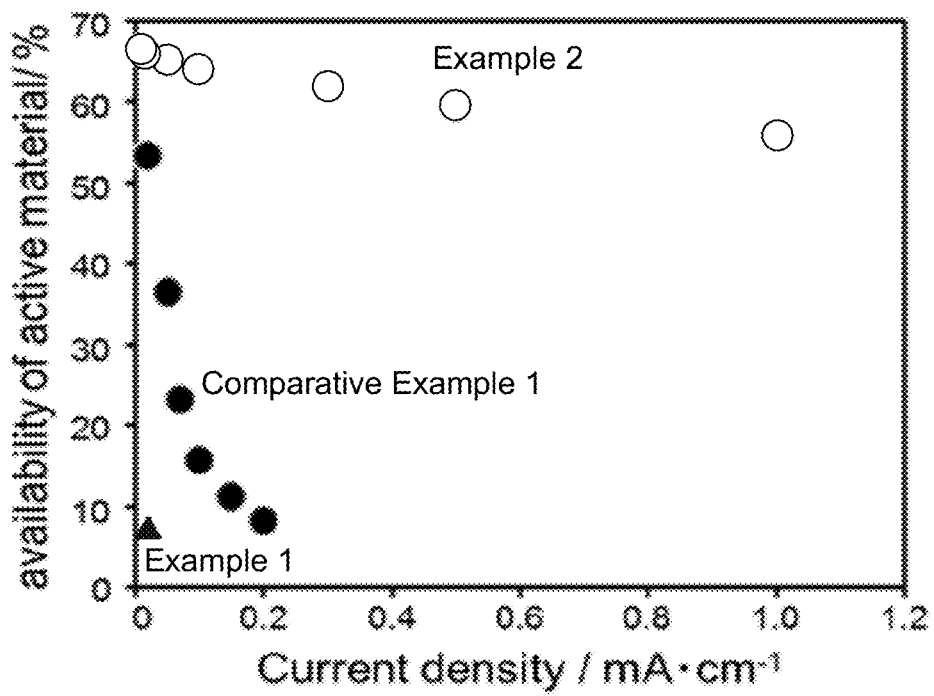
FIG. 9 is a diagram showing the results of a rate property evaluation to an evaluation battery obtained in each of Examples 1 and 2 and Comparative Example 1.

A rate property evaluation of the evaluation battery obtained in each of Examples 1 and 2 and Comparative Example 1 was carried out. Specifically, after charging until 1.5 V at 20 $\rho A/cm^2$, the current value was changed, and the battery was discharged until 0.3 V. The discharge capacity with respect to the capacity equivalent to reaction of two electrons (the theoretical capacity for $2F^-$) was obtained as the availability of the active material. The Results are shown in FIG. 9. As shown in FIG. 9, it was confirmed that the availability of the cathode active material in Example 2 was greatly improved compared to Example 1. Also, it was confirmed that the availability of the cathode active material in Example 2 was higher than Example 1, and further, that the deterioration of the availability when the current density is increased was low, and the rate property thereof was exceptionally good. As described above, a battery, using a conventionally not expected cathode active material layer that does not preliminarily include a solid electrolyte, exhibited remarkably excellent effects.

<XRD Measurement>

Figure 10:
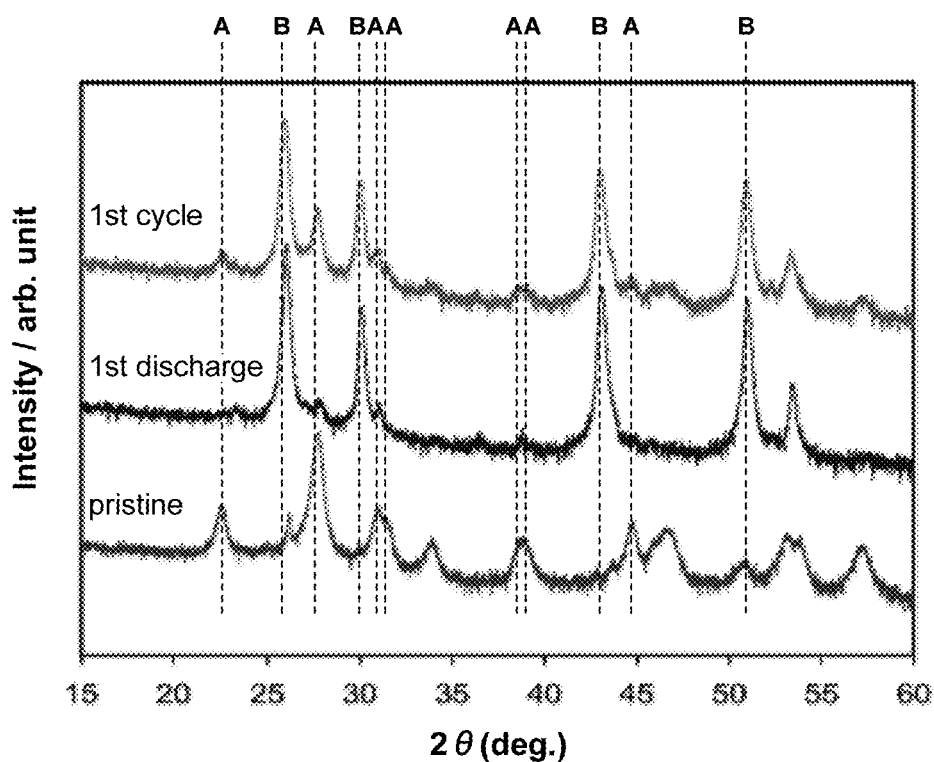
FIG. 10 is a diagram showing the result of XRD measurement to a cathode active material after the first discharge and after the first charge.

An XRD measurement was carried out to the cathode active material produced in Example 2. Also, an XRD measurement was carried out similarly to the cathode active material after the first discharge and after the first charge. The results thereof are shown in FIG. 10. As shown in FIG. 10, the peak of $Pb_2CuF_6$ (the peak shown with A in FIG. 10) became smaller, and the peak of $PbF_2$ (the peaks shown with B in FIG. 10) became larger by the first discharge. Therefore, it was confirmed that the phase split of $Pb_2CuF_6$ occurred by the first discharge. Also, the peak of $PbF_2$ (the peak shown with B in FIG. 10) became slightly smaller, and the peak of $Pb_2CuF_6$ (the peak shown with A in FIG. 10) became slightly larger by the first charge. Accordingly, it was confirmed that the regeneration of $Pb_2CuF_6$ occurred by the first charge. That is, it is presumed that the following reaction progressed reversibly by the first discharge and the first charge.

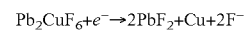

$$Pb_2CuF_6 + e^- \rightarrow 2PbF_2 + Cu + 2F^-$$

Figure 11:
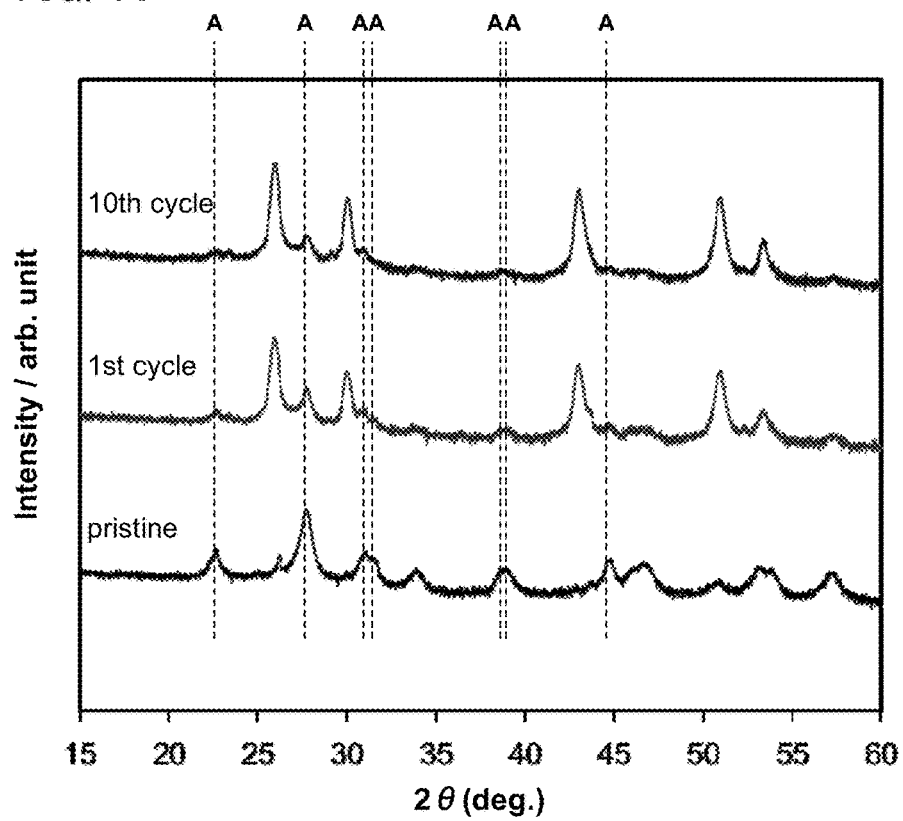
FIG. 11 is a diagram showing the result of XRD measurement to a cathode active material after one cycle and after 10 cycles.

Incidentally, since the peak of $PbF_2$ (the peak shown with B in FIG. 10) was confirmed also after the first charge (after 1 cycle), it is presumed that $Pb_2CuF_6$ was regenerated from a part of $PbF_2$ by the first charge. In this case, from the second discharge onward, it is presumed that Cu functions as a active material ($CuF_2 + e^- \rightarrow Cu + 2F^-$). Also, as shown in FIG. 11, even after 10 cycles, the peak of $Pb_2CuF_6$ (the peak shown with A in FIG. 11) was confirmed, and it was confirmed that the regeneration of $Pb_2CuF_6$ occurred.

Example 3

<Synthesis of Cathode Active Material>

A cathode active material ($Pb_{1.5}Cu_{1.5}F_6$) was obtained by weighing $PbF_2$ and $CuF_2$ so as to be $PbF_2:CuF_2=1:1$ in the molar ratio, and carrying out a mechanical milling, using a ball mill, under the conditions of 600 rpm for 3 hours. The composition of the obtained cathode active material corresponds to x=0.5 in $Pb_{2-x}Cu_{1+x}F_6$.

<Production of Evaluation Battery>

A cathode mixture was obtained by mixing the obtained cathode active material ($Pb_{1.5}Cu_{1.5}F_6$) and an acetylene black (AB) that is a conductive material (electron conductor) in the weight ratio of $Pb_{1.5}Cu_{1.5}F_6$:AB=95:5. An evaluation battery was obtained in the same manner as in Example 1 except that the obtained cathode mixture was used.

Example 4

A cathode active material ($PbCu_2F_6$) was obtained by weighing $PbF_2$ and $CuF_2$ so as to be $PbF_2:CuF_2=1:2$ in the molar ratio, and carrying out a mechanical milling, using a ball mill, under the conditions of 600 rpm for 3 hours. The composition of the obtained cathode active material corresponds to x=1 in $Pb_{2-x}Cu_{1+x}F_6$. An evaluation battery was obtained in the same manner as in Example 3 except that the obtained cathode active material was used.

Example 5

A cathode active material ($Pb_{0.5}Cu_{2.5}F_6$) was obtained by weighing $PbF_2$ and $CuF_2$ so as to be $PbF_2:CuF_2=1:5$ in the molar ratio, and carrying out a mechanical milling, using a ball mill, under the conditions of 600 rpm for 3 hours. The composition of the obtained cathode active material corresponds to x=1.5 in $Pb_{2-x}Cu_{1+x}F_6$. An evaluation battery was obtained in the same manner as in Example 3 except that the obtained cathode active material was used.

Example 6

A cathode active material ($Pb_{0.25}Cu_{2.75}F_6$) was obtained by weighing $PbF_2$ and $CuF_2$ so as to be $PbF_2:CuF_2=1:11$ in the molar ratio, and carrying out a mechanical milling, using a ball mill, under the conditions of 600 rpm for 3 hours. The composition of the obtained cathode active material corresponds to $x=1.75$ in $Pb_{2-x}Cu_{1+x}F_6$. An evaluation battery was obtained in the same manner as in Example 3 except that the obtained cathode active material was used.

Comparative Example 2

A cathode active material ($CuF_2$) was obtained by carrying out a mechanical milling of $CuF_2$, using a ball mill, under the conditions of 600 rpm for 3 hours. The composition of the obtained cathode active material corresponds to $x=2$ in $Pb_{2-x}Cu_{1+x}F_6$. An evaluation battery was obtained in the same manner as in Example 3 except that the obtained cathode active material was used.

<Charge and Discharge Test>

A charge and discharge test of the evaluation battery obtained in each of Examples 2 to 6 and Comparative Example 2 was carried out in a cell heated to 140° C. The current conditions were similar to that in Example 1. The results are shown in FIG. 12 and in Table 1.

TABLE 1

|  | Composition | Theoretical capacity mAh/g | Discharge capacity in first cycle mAh/g | Discharge capacity in second cycle mAh/g |
| --- | --- | --- | --- | --- |
| Example 2 | $Pb_2CuF_6$ | 90.5 | 66.5 | 65.0 |
| Example 3 | $Pb_{1.5}Cu_{1.5}F_6$ | 154.6 | 122.2 | 95.9 |
| Example 4 | $PbCu_2F_6$ | 239.1 | 198.1 | 154.0 |
| Example 5 | $Pb_{0.5}Cu_{2.5}F_6$ | 356.0 | 255.2 | 90.6 |
| Example 6 | $Pb_{0.25}Cu_{2.75}F_6$ | 432.8 | 288.3 | 33.5 |
| Comparative Example 2 | $Cu_3F_6$ ($CuF_2$) | 527.9 | 0 | 0 |

Figure 12:
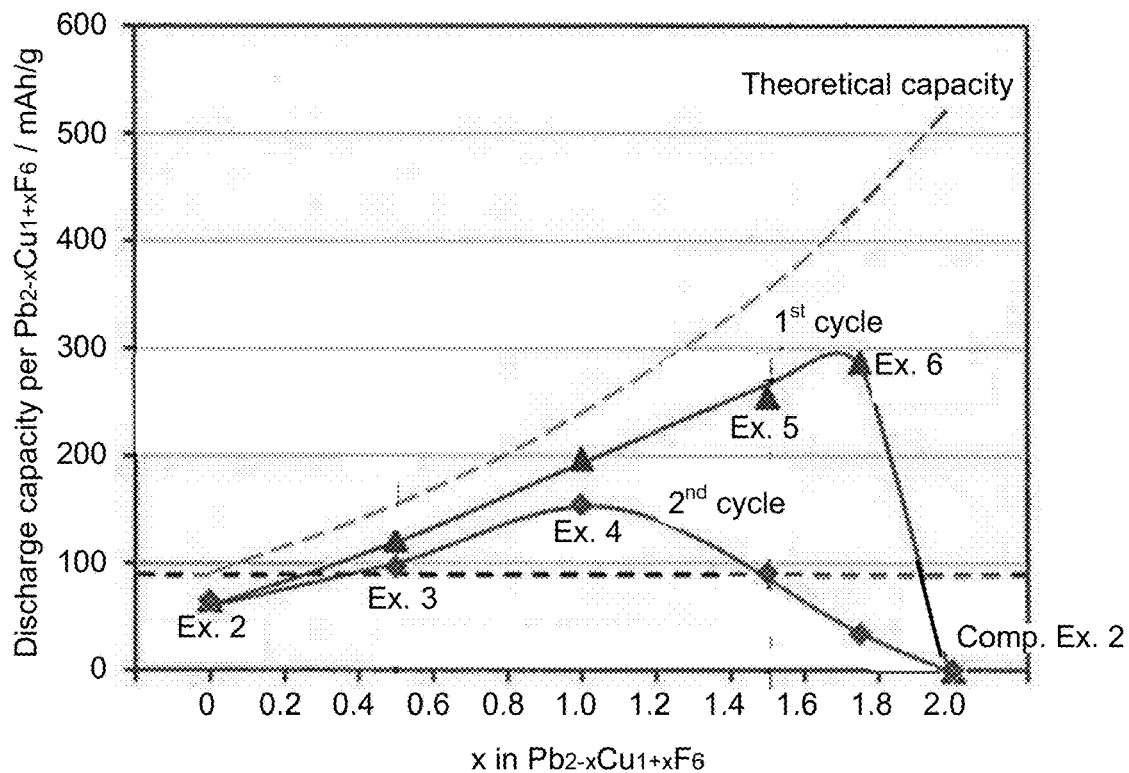
FIG. 12 is a diagram showing the result of a charge and discharge test to an evaluation battery obtained in each of Examples 2 to 6 and Comparative Example 2.

As shown in FIG. 12 and in Table 1, in each of Examples 2 to 6, a high discharge capacity was obtained in the first cycle. Also, when the value of x in $Pb_{2-x}Cu_{1+x}F_6$ increases, the theoretical capacity increases so that it is possible to increase the capacity, and similarly in each of Examples 2 to 6, an increase of the discharge capacity in the first cycle was possible. Meanwhile, in each of Examples 3 to 5 ($0.5 \leq x \leq 1.5$), the decrease of the discharge capacity was low even in the second cycle. That is, both of the increase of the capacity and the suppression of the decrease of the capacity were possible. The reason therefor is presumed that, since Cu generated upon discharge was not coarsened, a crack in the cathode active material layer could be suppressed from occurring.

<XRD Measurement>

Figure 13:
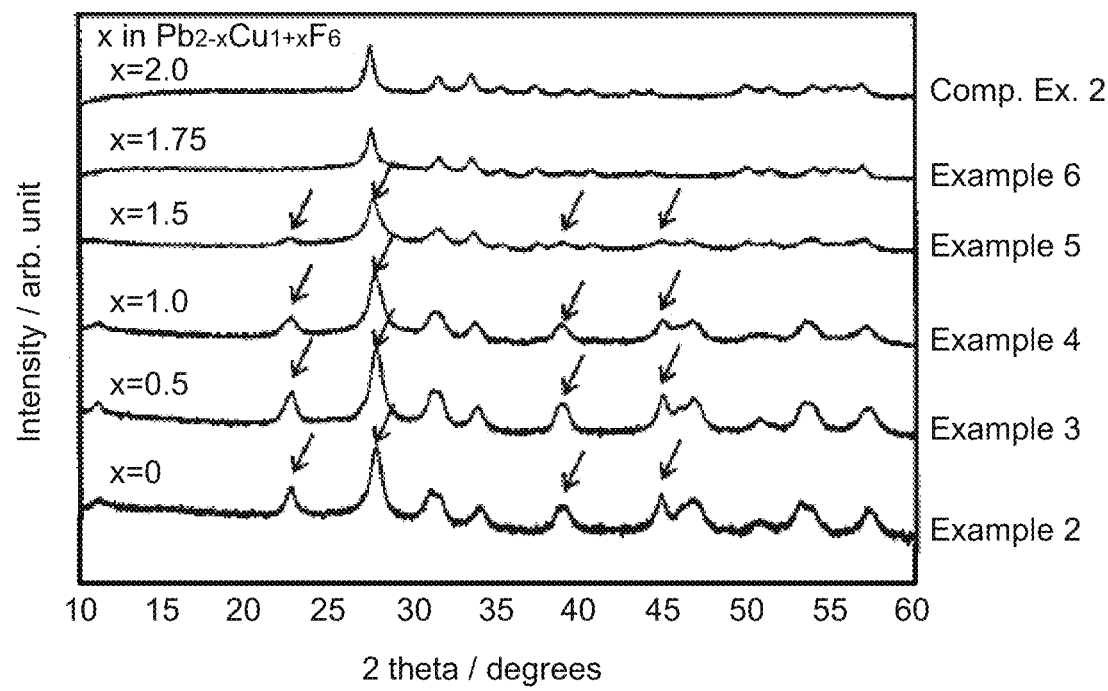
FIG. 13 is a diagram showing the result of XRD measurement to a cathode active material produced in each of Examples 2 to 6 and Comparative Example 2.

An X-ray diffraction measurement (XRD measurement) was carried out to the cathode active material produced in each of Examples 2 to 6 and Comparative Example 2. Incidentally, a CuKα ray was used as a radiation source. The results are shown in FIG. 13. As shown in FIG. 13, even though each cathode active material produced in Examples 3 to 5 has different composition with each other, it was confirmed that all of the cathode active materials had the $Pb_2CuF_6$ structure. Specifically, it was confirmed that each cathode active material produced in Examples 3 to 5 had the typical peak of the $Pb_2CuF_6$ structure (a peak in the vicinity of $2\theta=22.6°$, $27.8°$, $38.7°$ and $44.8°$.

Since the cation sequence of the $Pb_2CuF_6$ crystal structure and the $CuF_2$ crystal structure are similar, it is presumed that $Pb_2CuF_6$ and $CuF_2$ are capable of forming a solid solution. Therefore, it is presumed that, in the cathode active material produced in each of Examples 3 to 5, $CuF_2$ is solid-dissolved into $Pb_2CuF_6$. Incidentally, although the discharge capacity in the first cycle was high in Example 6 so that it functions as the cathode active material as described above, only the peak of $CuF_2$ structure was confirmed and the peak of $Pb_2CuF_6$ structure was not confirmed, similarly to Comparative Example 2.

Figure 14:
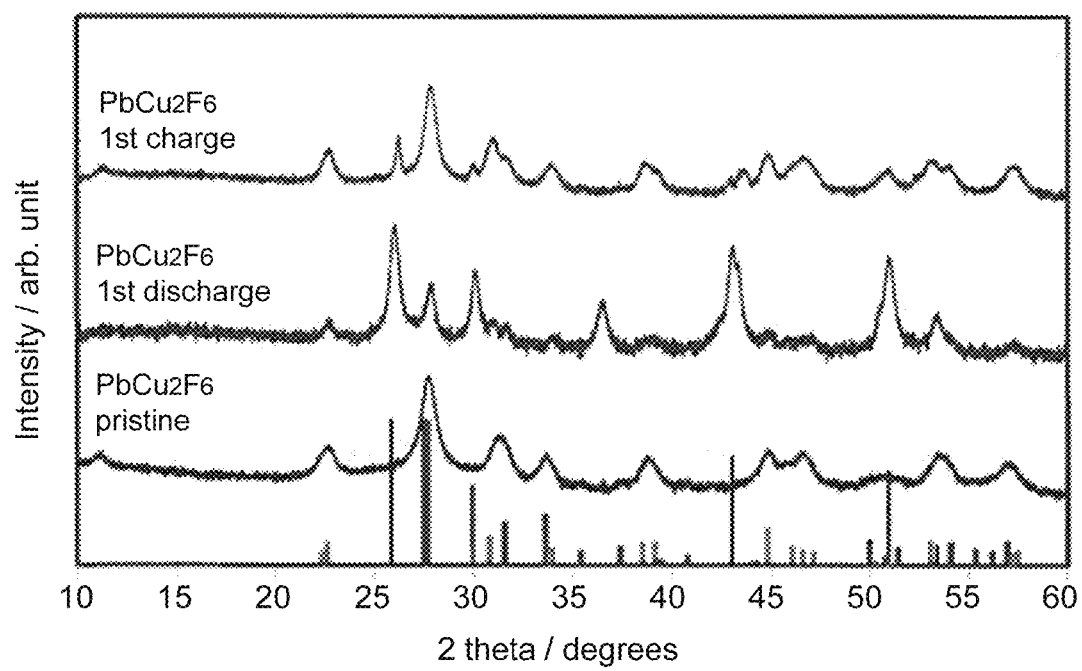
FIG. 14 is a diagram showing the result of XRD measurement to a cathode active material after the first discharge and after the first charge.

Also, an XRD measurement was carried out similarly to the cathode active material after the first discharge and after the first charge in Example 4. Incidentally, as described above, the cathode active material ($PbCuF_6$) produced in Example 4 had the $Pb_2CuF_6$ structure. The results of the XRD measurement are shown in FIG. 14. As shown in FIG. 14, the peak of $Pb_2CuF_6$ structure (such as a peak in the vicinity of $2\theta=27.8°$) became smaller, and the peak of $PbF_2$ (such as a peak in the vicinity of $2\theta=260$) became larger by the first discharge. Therefore, it was confirmed that the phase split of $Pb_2CuF_6$ structure occurred by the first discharge. Also, the peak of $PbF_2$ (such as a peak in the vicinity of $2\theta=26°$) became slightly smaller, and the peak of $Pb_2CuF_6$ structure (such as a peak in the vicinity of $2\theta=27.8°$) became slightly larger by the first charge. Accordingly, it was confirmed that the regeneration of $Pb_2CuF_6$ structure occurred by the first charge.

REFERENCE SIGNS LIST 1 cathode active material layer
2 anode active material layer
3 electrolyte layer
4 cathode current collector
5 anode current collector
6 battery case
10 fluoride ion battery

What is claimed is:

1. A fluoride ion battery comprising a cathode active material layer, an anode active material layer, and an electrolyte layer formed between the cathode active material layer and the anode active material layer, wherein
the cathode active material layer includes a cathode active material of granular shape and comprising a composition represented by $Pb_{2-x}Cu_{1+x}F_6$, wherein $0 \leq x < 2$.

2. The fluoride ion battery according to claim 1, wherein the x satisfies $x \leq 1.75$.

3. The fluoride ion battery according to claim 1, wherein the x satisfies $0.5 \leq x \leq 1.5$.

4. The fluoride ion battery according to claim 1, wherein the electrolyte layer is a solid electrolyte layer.

5. The fluoride ion battery according to claim 4, wherein the cathode active material layer does not include a solid electrolyte.

6. The fluoride ion battery according to claim 4, wherein the cathode active material layer includes only $PbF_2$ as a solid electrolyte.

7. A fluoride ion battery comprising a cathode active material layer, an anode active material layer, and an electrolyte layer formed between the cathode active material layer and the anode active material layer, wherein the cathode active material layer includes a cathode active material of granular shape and comprising a Pb element, a Cu element, and a F element, and the cathode active material has a peak at a position of $2\theta=22.6°\pm0.5°, 27.8°\pm0.5°, 38.5°\pm0.5°,$ and $44.8°\pm0.5°$ in X-ray diffraction measurement using a CuKα ray.

8. The fluoride ion battery according to claim 7, wherein the electrolyte layer is a solid electrolyte layer.

9. The fluoride ion battery according to claim 8, wherein the cathode active material layer does not include a solid electrolyte.

10. The fluoride ion battery according to claim 8, wherein the cathode active material layer includes only $PbF_2$ as a solid electrolyte.

11. The fluoride ion battery according to claim 7, the cathode active material comprises a composition represented by $Pb_{2-x}Cu_{1+x}F_6$, wherein $0 \leq x < 2$.

12. The fluoride ion battery according to claim 7, characterized in that the x satisfies $x \leq 1.75$.

13. The fluoride ion battery according to claim 7, characterized in that the x satisfies $0.5 \leq x \leq 1.5$.

* * * * *